United States Patent Office 3,412,018
Patented Nov. 19, 1968

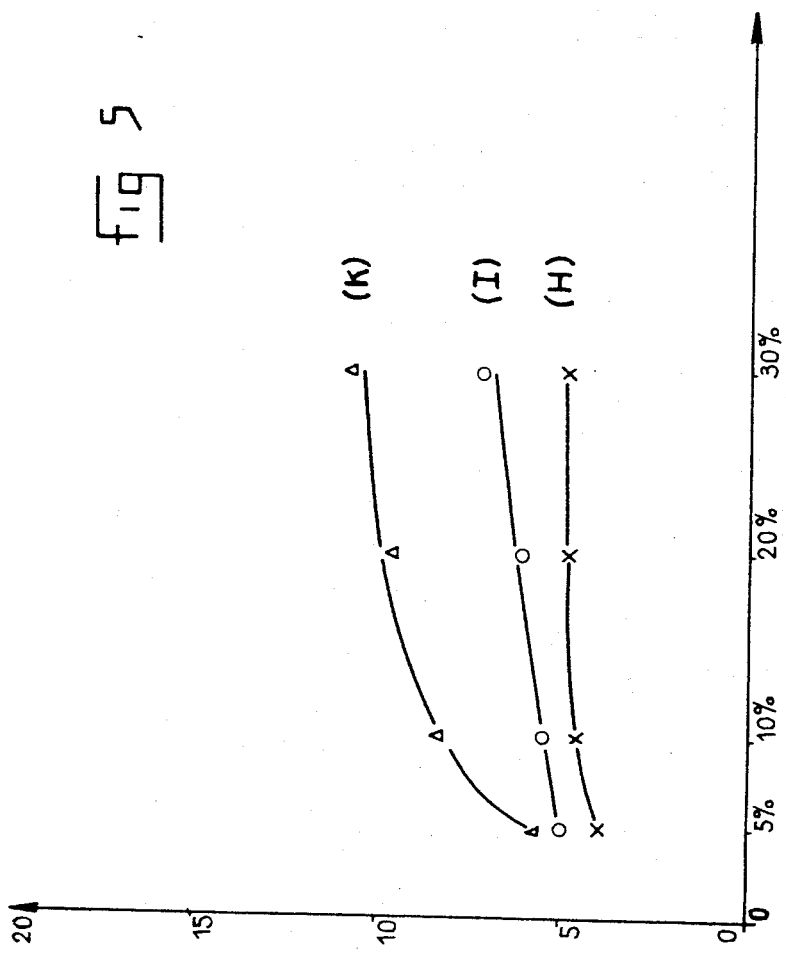

3,412,018
WATER PURIFYING PROCESS
Pierre Monzie, Talence, France, assignor to Centre Technique de l'Industrie des Papiers, Cartons et Celluloses, Gières, Isère, France, and Institut du Pin, Cours de la Liberation at Gradignan, Gironde, France, both establishments of France
Filed Nov. 14, 1966, Ser. No. 593,807
Claims priority, application France, Nov. 15, 1965, 38,337
10 Claims. (Cl. 210—21)

ABSTRACT OF THE DISCLOSURE

Residual waters containing wood and vegetable incrusting media and their degradation products, such as effluents from manufacture of cellulose and chemical and semi-chemical paper pulp, are purified by adjusting their pH to 2–5, contacting them with an organic phase containing an amine insoluble in water and of molecular weight of at least 250 in solution in a diluting agent non-miscible in water and having a dielectric constant lower than 4.8 to form substantially water insoluble organophilic amine complexes and compounds of the organic matters and colored products of the water, following which the organic phase containing said complexes and the compounds is decanted from the purified water.

---

Figure 1:
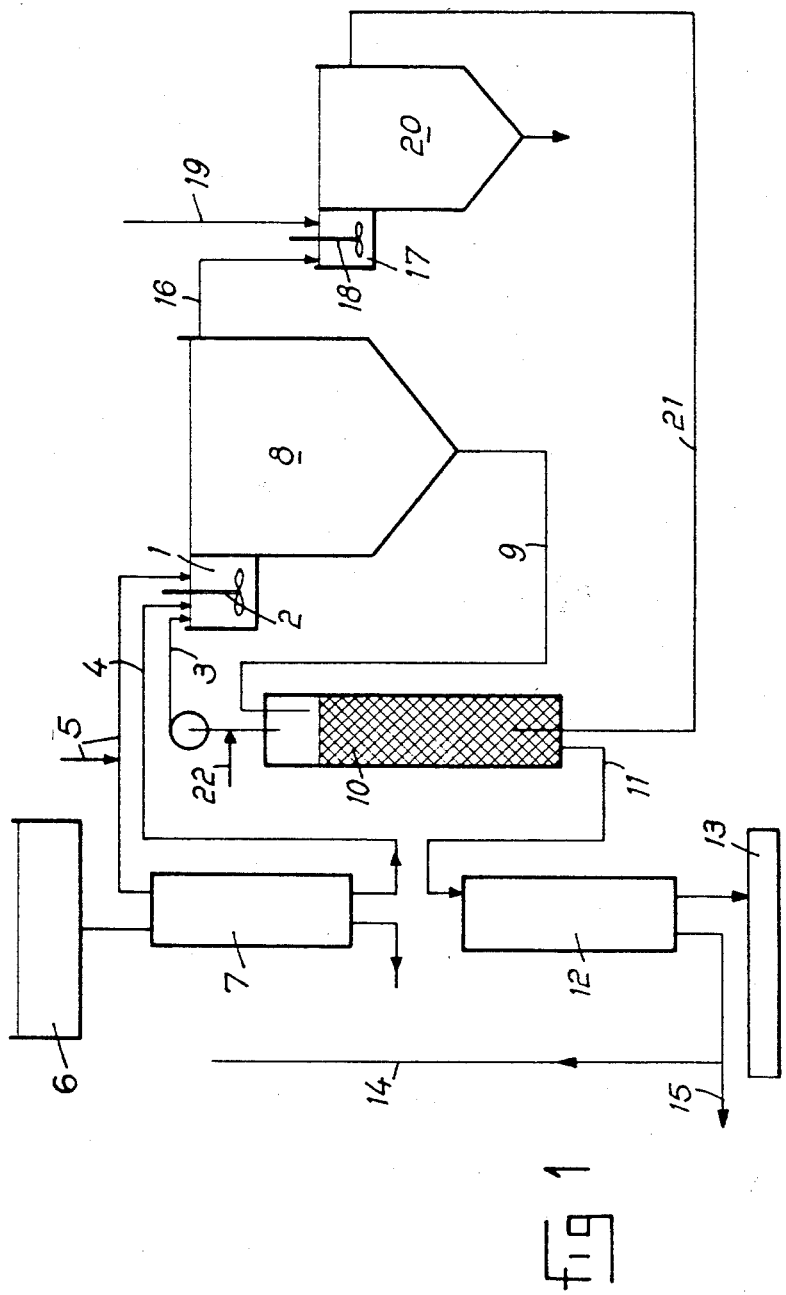

The present invention relates to a process for purifying residual waters containing wood and vegetable incrusting media and their degradation products; (lignin, sugars, fatty and waxy substances, resin, colouring and tanning materials and mineral substances etc.) and more particularly effluents from the manufacture of cellulose and chemical and semi-chemical paper pulp.

Hereinafter, these incrusting media and their degradation products will be designated by the expression "organic substances and coloured substances."

The effluents, constituted by residual water from the different stages of the manufacture of paper: washing and purifying of the raw pulp, bleaching, etc. cannot be recuperated as they are diluted too much. Before being rejected, they must undergo a treatment, the object of which is to reduce their B.O.R. (Biological Oxygen Requirement) and to make them comply with regulations concerning the rejection of industrial water. This treatment which is generally of a biological nature, acts upon the constituents which are most easily degradable by the biological process, but causes only a slight reduction in the C.O.R. (Chemical Oxygen Requirement).

It has already been proposed to treat the sulfite residual solutions containing lignosulfonic acids with the aid of tri-n-hexylamine, dodecylamine and dicyclohexylamine in solution in an alcoholic solvent for the purpose of separating or fractionating said lignosulfonic acids.

It is also known to purify black solutions by extraction by a solvent.

Moreover, it is known to treat the consumed water generally by precipitation in the aqueous phase with the aid of heavy cations (aluminium sulfate, lime), followed by decantation, filtration, thickening and partial drying of the mud formed.

However, these treatments are generally not very effective and in addition are particularly costly, long and difficult to effect on an industrial scale.

The present invention has for an object a purification process which is effective, rapid and simple to carry out.

Moreover, with regard to the purification, it brings forward the following new characteristics: powerful decoloration, deodorization, reduction of the foaming power.

These effects which complete those of the biological purification, result from the specific elimination of the products which are not easily degradable by the biological process, in particular lignin (or its derivatives and degradation products) and various other organic impurities.

In addition, on a more general scale, it permits actual recuperation:

(a) Of the organic materials extracted, of high calorific power (lignin) which can be returned to the regenerating workshop at such a concentration that recuperation becomes profitable;

(b) Of part of the mineral salts, the organic acids coming from the degradation of the polyosides (acetic, formic, saccharinic, aldonic, etc.), fatty and resinic acids;

(c) Of at least one part of the treated water by reason of the quality of the purification; this method thus shows the possibility of reducing the balance of clean water necessary for manufacturing paper pulp.

The process according to the invention utilizes an organic phase, essentially composed of an amine which is practically insoluble in water, having a high molecular weight of about at least 250, in solution in a diluting agent which is not water-miscible, and having a dielectric constant, measured at 20° C., lower than 4.8.

Such a method includes a purification stage in which this organic phase is placed in contact and is intimately mixed with the residual water to be treated which is previously returned if necessary to a pH value up to and including pH 5. The amine chosen has the particular feature of forming addition compounds or complexes with the lignin or its derivatives and, as the case may be, of causing or facilitating the formation of a very organophilic precipitate which decants easily and is extracted in the organic phase; it can be evacuated without difficulty at the same time as the organic phase. Moreover, the amine reacts with coloured non-colloidal products, other than lignin and derivatives contained in the residual water to be treated, in order to give compounds of almost unknown nature, but soluble in the organic phase, or at least very organophilic, which are also extracted from said organic phase.

After decantation, there can be collected:

A considerably decoloured aqueous phase, totally free of lignin, and, at least for a large part, of various substances arising from the degradation of wood during chemical treatments, as well as of various compounds responsible for the odour or the formation of foam;

A charged organic phase containing the amine in the state combined with the organic substances and the coloured substances extracted.

According to another feature of the invention, the purification stage is followed by a second stage, known as a "regenerating" stage in which the charged organic phase arising from the purification stage is placed in contact with an aqueous alkaline solution for destroying the salts or various complexes of the amine whilst regenerating it; an organic phase containing the regenerated amine and an aqueous alkaline phase containing all the organic and coloured matters extracted by said amine in the concentrated state, are then recuperated. The organic phase containing the regenerated amine is recycled towards the purification stage and the aqueous alkaline solution containing the treated matters in the concentrated state may be returned into the flowline of the factory for recuperating said organic products.

In short, the organic phase ensures both the extraction of the organic matters and the coloured matters contained in the residual water and their concentration and drying without having to resort to a conventional evaporation stage. Its purpose is therefore fundamental and the choice of the amine and the diluting agent must be guided by the following desiderata:

The amine must have a high molecular weight, of at least about 250, a strong affinity for the diluting agent, and must be practically insoluble in water.

With the organic matters and the coloured matters to be extracted from the residual water, it must give various salts and complexes which are practicaly insoluble in water, soluble in the diluting agent or at least considerably organophilic.

The diluting agent must be non-miscible in water and preferably practically insoluble in water (solubility lower than or equal to preferably 0.1%) and must save a dielectric constant of 20° C. lower than 4.8, preferably from 1.85 to 3.0.

The amines can be chosen from the following classes:

(A) The primary, secondary and tertiary long chain aliphatic amines, with a high molecular weight of about at least 250 and practically insoluble in water, and in particular the following:

tri-isooctylamine, N-lauryltrialkylmethylamine (Amberlite LA 2), N-dodecenyl-trialkylmethylamine (Amberlite LA 1), trilaurylamine, tricaprylamine, tri-n-hexylamine, and the primary amines from $C_{20}$ to $C_{25}$.

(B) The aromatic amines with high molecular weights of about at least 250, in particular tribenzylamine.

(C) The mixed aliphatic-aromatic amines with high molecular weights of about at least 250, such as benzyldilaurylamine, N-benzyl-1-(3-ethylpentyl) - 4 - ethyl-octylamine.

As diluting agents, there may be used the non-water miscible solvents of said amines, and in particular the following.

|  | Dielectric constant (20° C.) |
|---|---|
| (a) Aromatic solvents: | |
| Benzene ($s=0.082\%$) | 2.28 |
| Toluene ($s=0.0047\%$) | 2.38 |
| Xylene (insoluble) | 2.25 to 2.56 |
| Trimethylbenzene (insoluble) | 2.29 |
| Diethylbenzene (insoluble) | 2.235 |
| Dodecylbenzene (insoluble) | 2.20 |
| (b) Aliphatic solvents: | |
| Hexane ($s=0.014\%$) | 1.89 |
| Heptane ($s=0.0052\%$) | 1.92 |
| Octane ($s=0.0015\%$) | 1.95 |
| Nonane | 1.97 |
| Decane | 1.99 |
| Dodecane | 2.01 |
| Liquid paraffinic cuts up to about $C_{12}$ cycloparaffins: | |
| Cyclohexane | 2.02 |
| Alkylcyclohexanes | |
| (c) Chlorinated solvents: | |
| Carbon tetrachloride ($s=0.08\%$) | 2.24 |
| Trichloroethylene ($s=0.10\%$) | 3.40 |
| (d) Petroleum solvents: | |
| Petroleum ether | |
| Heavy oils | |
| White spirit | |
| Kerosene | 1.85 to 2.6 |
| Illuminating oil | |
| Gas-oil | |
| Fuel-oil | |

In the above $s$=solubility in water, g./100 ml.

In order that the invention may be more clearly understood, reference will now be made to the accompanying drawings which show by way of example in FIGURE 1 an installation for carrying out the process according to the invention and essentially comprising a circuit for purifying the residual water and a circuit for regenerating the organic phase, and in FIGURES 2 to 5, certain explanatory graphs.

*Flowline for purifying the residual water*

Referring now to FIGURE 1, there is shown a mixer 1 provided with an agitator 2, an organic phase inlet 3 (amine+diluting agent), an inlet 4 for the residual water to be treated and an acid inlet 5, and in this mixer an intimate contact is effected between the organic phase and the residual water to be treated and, if necessary, the quantity of acid necessary for acidifying the aqueous phase in equilibrium with the organic phase at a pH value lower than or equal to pH 5, preferably between 2 and 4. A pH value lower than pH 2 would not harm the purification but would cause an excessive consumption of acid which is not necessary. A pH value higher than pH5 leads to an insufficient decoloration and to a less satisfactory decantation.

The proportions of the mixture of amine and diluting agent vary with the nature and the concentration of the water treated and must be determined in each case. They will be specified later in the particular example illustrating in detail how the process of this invention is carried out.

In the case of the alkaline or neutral residual water, it is advantageous to effect a more or less rapid previous demineralization of this water coming from the tank 6, in a cation exchanger column 7, so as to reduce the quantity of acid and consequently the amount of mineral matter at the end of the purification. The regeneration of the cation exchanger having served previously to demineralize the water, is effected with the aid of acid introduced through the conduit 5a.

At the outlet of the mixer 1, the homogeneous mixture is separated in its two phases in a decanter 8. In order to facilitate the decantation (static or forced), it is preferable to maintain the mixture at a temperature between 40° C. and 60° C., according to the nature of the water treated.

At the base of the decanter 8, there is collected through the conduit 9, considerably decolored water whose purification is advantageously completed by a supplementary purification by being placed in contact with the organic phase in regenerated form. In order to obtain at this stage a very powerful decoloration, it is preferable to lower the temperature of the water at the outlet of the decanter 8 to 30° C. This second purification can be effected in a simple lined column 10 and also permits one part of the excess acid still contained in the aqueous phase to be recuperated and recycled at 1 by means of the amine contained in the regenerated organic phase.

At the base of the column 10 there is collected, through the conduit 11, some water which still contains organic acids of low molecular weight coming from the degradation in particular of the polyosides and the mineral salts. Their purification can be effected in an anion exchanger column 12 for one of the following purposes:

(a) Recuperation of the organic acids in a clean mixture (tank 13) which can be valorized or stabilised after being fractionated into its main constituents. This operation is rendered possible by the preceding operation.

(b) Reduction of the amount of organic matters (C.O.R.) below a level rendering its recycling possible.

Purified water is then either recycled through the conduit 14 or rejected through the conduit 15.

*Flowline for the regeneration of the organic phase*

The light phase (organic phase+organophilic precipitate) is collected through the conduit 16 in the upper part of the decanter 18, which light phase is placed in contact with the necessary quantity of an aqueous alkaline solution (concentrated solution of soda, white solution or black solution for example) in order to dissolve the organophilic precipitate and to displace the amine from all its addition compounds with the organic matters and the coloured matters extracted from water to be purified. The contacting takes place in a second mixer 17 provided with an agitator 18 and an inlet 19 for the alkaline solution and necessitates only a very moderate agitation. The mixture obtained is separated into its two phases in a second decanter 20. For the purpose of avoiding the formation of emulsion and of accelerating the separation in this second decanter 20, it is preferable to take the mixture in the mixer 17 to a temperature equal to or greater than 60° C. Below this temperature, decantation is long. The organic phase containing the regenerated amine is collected in the upper part of the decanter and sent through the conduit 21 into the column 10 for the purpose of the second purification of the water, then recycled to the mixer 1 via the conduit 3, the balance of organic phase (diluting agent+amine) being introduced through the conduit 22.

At the base of the decanter 20 there is collected the aqueous alkaline solution containing all the organic matters and the coloured matter extracted by the amine and in concentrated state. This heavy phase, carefully decanted in order to avoid the light phase being carried down, is evacuated through the conduit 33 into the regeneration flowline of the factory (where it can be dried and burnt directly).

Another advantage of the invention resides in the fact that in the case of treating the alkaline residual water, the quantity of acid to be used either for directly acidifying this water (via the conduit 5), or for regenerating (via conduit 5a) the cation exchanger (column 7) having served to demineralise them, would be excessively costly if the factory did not have any recuperation acids ($SO_2$ recuperable from the fumes from boilers, acid water coming from bleaching etc.). Now, these expenses can be avoided by directly preparing in a known manner $SO_2$ from sodium sulfide contained in the green solution always available in paper making.

The present process of purification is applicable to the treatment of the residual water containing wood and vegetable incrusting media (lignin, sugars, fatty and waxy substances, resin, colouring and tanning materials and mineral substances) and more particularly to the treatment of the effluents coming from the manufacture of cellulose and chemical and semi-chemical paper pulp, in particular effluents coming either from the washing and purification of raw pulp, or from the bleaching workshop, in particular the chlorosodation.

Moreover, it can be extended to the effluents of the following main industrial processes employed in papermaking:

Alkaline processes (soda, sulfate).
Acid processes (bisulfite of Na, Mg, $NH_4$, Ca).
Neutral processes (sodium sulfite).

In each case, it is suitable to effect an operation which relates to the choice of the amine and the diluting agent from the point of view of affinity for the organic matters and the coloured matters to be extracted, of the speed of decantation and the recuperation of the organic phase; the determination of the operative conditions, in particular temperature, pH value during the purification and the regeneration; and the proportion and the composition of the organic phase to be used.

The invention will be further illustrated by reference to the following examples.

EXAMPLE 1

Purification of an effluent arising from a washing installation for a raw kraft pulp or a cluster (maritime) pine.

The composition of the water subjected to the purification is as follows:

Dry matter _____ g./l__ 6.4
Mineral matter (expressed in NaOH) _____ g./l__ 2.2
Organic matters (by difference) (1.8 g./l. of which is lignin) _____ g./l__ 4.2
Organic matters (by direct dosage—by oxidation by bichromate—oxygen consumed in mg./l.) mg./l__ 5555

This water supplied by the tank 6 has previously been demineralised in a cation exchanger of the sulphonic type (Dowex 50, Amberlite 200, Amberlite IR 120 for example) in the column 7, up to pH 2, then intimately mixed in the mixer 1 with 20% by volume of kerosene enclosing 1% by volume (with respect to the water to be treated) of N-lauryl-trialkyl-methyl amine (Amberlite LA-2 manufactured by ROHM and HAAS, Philadelphia). The mixture taken to 55° C. to 60° C. is rapidly separated into two phases in the decanter 8.

If the temperature is raised to above 60° C., the speed of separation of the two phases will be improved but this would be to the detriment of the decoloration. On the other hand, at a lower temperature, the decoloration is improved but the hydration of the precipitate is increased and the concentration of organic matters after regeneration is reduced all the more: in practice, under the conditions specified for this experiment, the precipitate of lignin carries down only about 5 to 10% of the total volume of the treated water.

In this example, the lignin contained in the treated water is in the form of thiolignin which is insoluble in an acid medium. The amine forms with this lignin organophilic compounds which are extracted from the organic phase.

In order to improve the decoloration during the second purification in the lined column 10, the water has been cooled to about 30° C. The water after the second purification is at a pH value close to pH3 and comprises the following composition:

Dry matter _____ g./l__ 1.7
Mineral matter (in NaOH) _____ g./l__ 0.2
Organic matter (by difference) (none of which is lignin) _____ g./l__ 1.5
Organic matters (by direct dosage—by oxidation by bichromate—oxygen consumed in mg./l.) _____ mg./l__ 1710

It may be considered that the purification treatment at this stage has eliminated 65% (2.7 g./l.) of the organic matter (which is composed of all the lignin, or 1.8 g./l. lignin). The effect of decoloration measured by comparing the optical density at 450 m$\mu$ is considerable and shows the selectivity of the treatment over the coloured substances. It can in fact be estimated that the complete purification eliminates 95% of the coloured substances present in the effluent.

The amount of organic substances is further reduced by the anion exchanger (Dowex 2, Dowex 3, Amberlite IR 45, Amberlite IRA 68 for example) in the column 12 which permits the elimination and the recuperation of the organic acids (formic, acetic, lactic, glycolic, saccharinic) which are stored in the tank 13.

The light phase collected in the upper part of the decanter 8 is directed towards the regeneration circuit. It is placed in contact with the alkaline regenerating solution in the mixer 17 then in the decanter 20. In practice, one has used as the alkaline solution, either 1 to 1.3% by volume, with respect to the water treated, of a white solution 3 N in free soda, or 10% by volume of black solution at 14° Bé. These experimentally determined proportions permit all the amine to be regenerated. This can be ensured by checking the pH value which must be higher than 11 in the heavy phase collected at the base of the decanter 20. The mixture is heated to 60° to 70° C. in said decanter in order to accelerate the separation of the two phases.

The regenerated organic phase is collected in the upper part of the decanter 20 and recycled towards the mixer 1 via the lined column 10 for the second purification of the water.

The aqueous phase which is rich in organic matters and coloured matters extracted by the amine is collected at the base of the decanted for the purpose of recuperating said organic matters constituted for the most part by lignin and its derivatives.

By replacing in this example the amine LA 2 and the diluting agent kerosene by other amines and other diluting agents according to the invention, mentioned above, there is obtained in all cases, after complete purification, an elimination of about 65% of organic matters and about 90 to 98% of coloured products.

In Table I which follows are mentioned the results obtained with various amines and various diluting agents according to the invention.

TABLE I

[Residual coloration in percent]

| Amines used | Tri-lau-rylamine | Amberlite LA 2 | Tri-n-hex-xylamine |
|---|---|---|---|
| Purification pH value | 2.1 | 2.5 | 2.0 |
| Diluting Agents, percent: | | | |
| Kerosene | 7.4 | 4.0 | 8.8 |
| Xylene | 6.1 | 3.5 | 9.9 |
| Carbon tetrachloride | | 3.0 | |

For comparative purposes these three amines were used according to the invention but with commercial diluting agents, not within the scope of the invention, namely—

| Diluting agent: | Dielectrical constant at 20° C. |
|---|---|
| Chloroform | 4.81 |
| Amylic alcohol | |
| Isoamylic alcohol | |
| Butanol | 17.8 |
| Hexanol | 13.3 |
| Cyclohexanol | 15.0 |

Very unsatisfactory results were obtained which could not be calculated due to the very small decoloration and the considerable agitation of the aqueous phase, one part of the amine being retained in the form of emulsion in the aqueous phase by a considerable part of the lignin precipitate. In addition, with this combination, the aqueous phase is polluted by a considerable quantity of diluting agent which is too soluble in water, this being contrary to the purification which it is desired to produce.

Similarly, by using commercial amines not within the scope of the invention, such as dodecylamine, dicyclohexylamine, diphenylamine, in combination with commercial diluting agents not within the scope of the invention, such as those mentioned above, a mediocre purification and decoloration is obtained in all cases.

EXAMPLE 2

This example shows the influence of the pH value, the temperature, the quantity of amine and that of the diluting agent on the decoloration of a water for washing raw kraft pulp of cluster (maritime) pine containing about 6 g./l. dry substances.

*Influence of the pH value on the decoloration*

Figure 2:
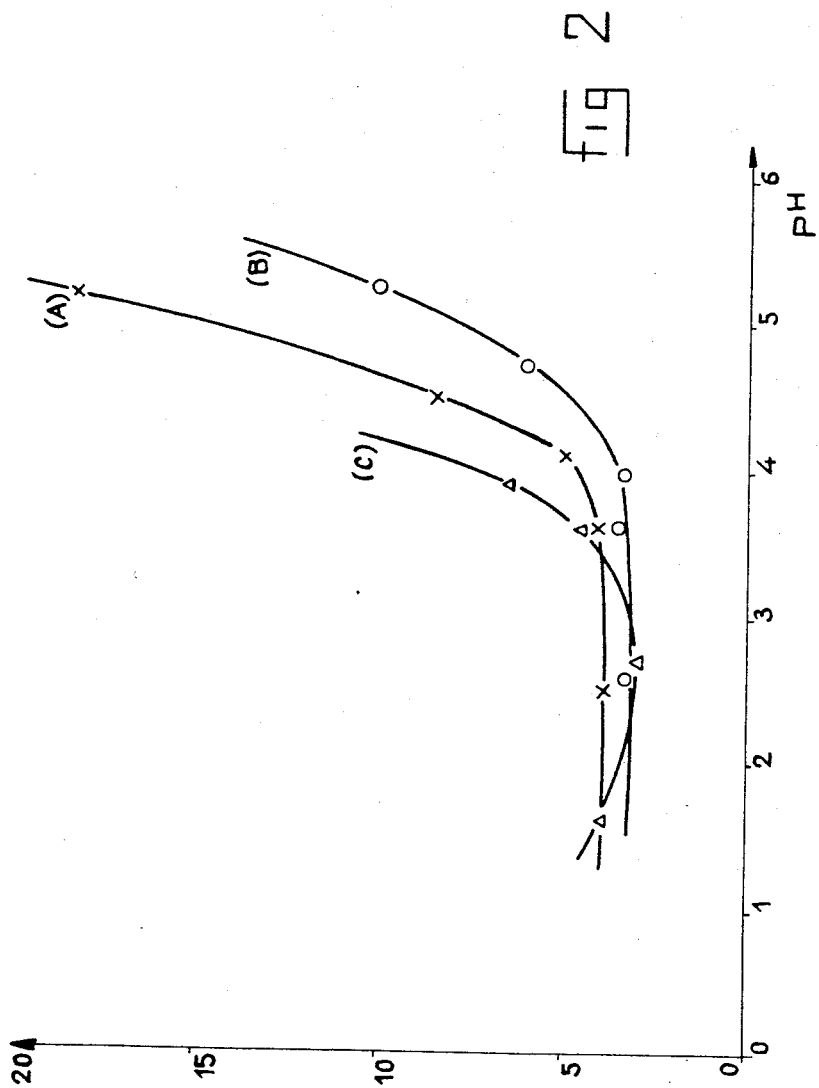

The graph of FIGURE 2 of the accompanying drawings shows the residual coloration (expressed in percent of the initial coloration with reference to the optical density at a wave length of 450 m$\mu$) as a function of the purification pH value, with an organic phase composed of 1% by volume of amine (LA-2) and 20% of diluting agents (kerosene: curve A; xylene: curve B; carbon tetrachloride: curve C).

These curves show that above a certain pH value for the amine in question, the treatment rapidly loses its efficiency; this upper limit below which one must operate, varies slightly with the solvent (pH 3.5 for kerosene, pH 4 for xylene, pH 3 for carbon tetrachloride).

For the same solvent, the experiments have shown moreover, that this limit is lower for the tertiary amines than for the secondary amines.

*Influence of the pH value and the temperature on the decoloration*

Figure 3:
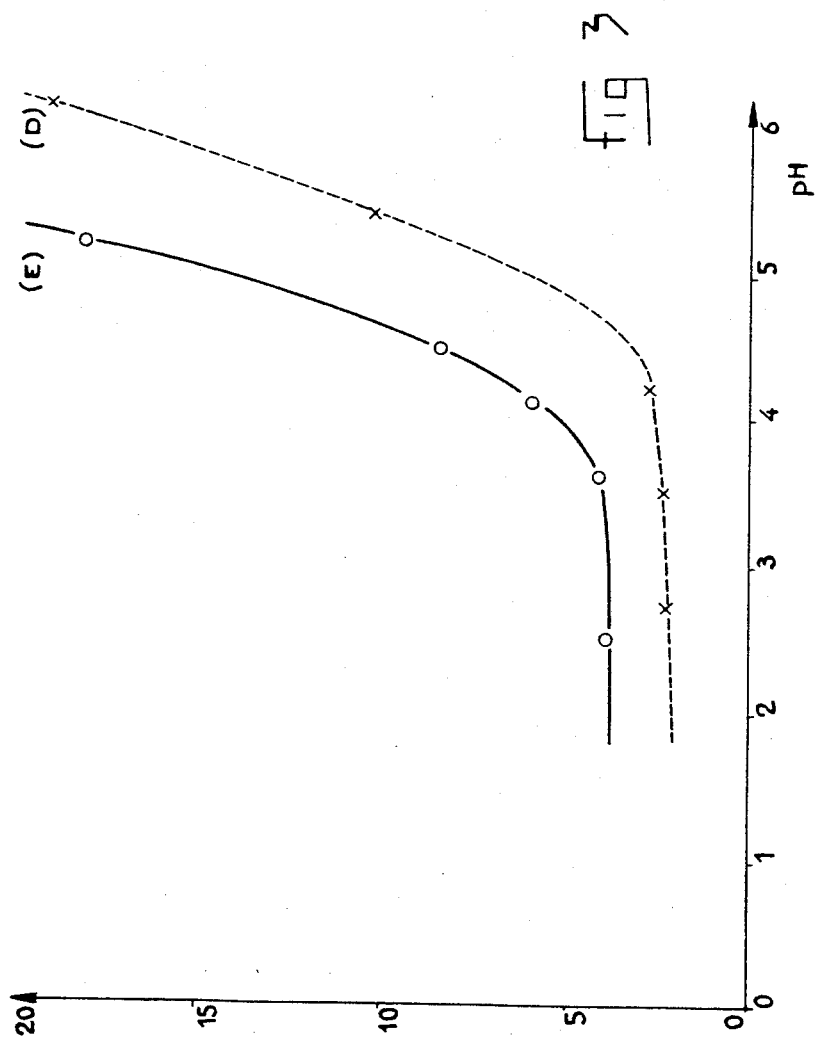

FIGURE 3 of the accompanying drawings shows the residual coloration as a function of the purification pH value at two treatment temperatures (20° C.: curve D; 45° C.: curve E) with an organic phase composed of 1% by volume of amine LA-2 and 20% by volume of kerosene with respect to the water to be treated.

These curves show that for a determined amine and a determined diluting agent, a rise in temperature (from 20° C. to 45° C. in the present case) tends on the one hand to reduce the efficiency of the treatment in the favourable pH zone, and on the other hand tends to lower the upper favourable pH limit. It would therefore be advantageous to purify at ambient temperature but in practice it is preferable in the case of waters to be purified which leave manufacture at a higher temperature from 40° C. to 60° C., to treat them directly in order to increase the speed of separation of the two phases and in order to reduce the quantity of water carried down by the organic phase, to the detriment of the decoloration.

*Influence of the quantity of amine on the decoloration*

Figure 4:
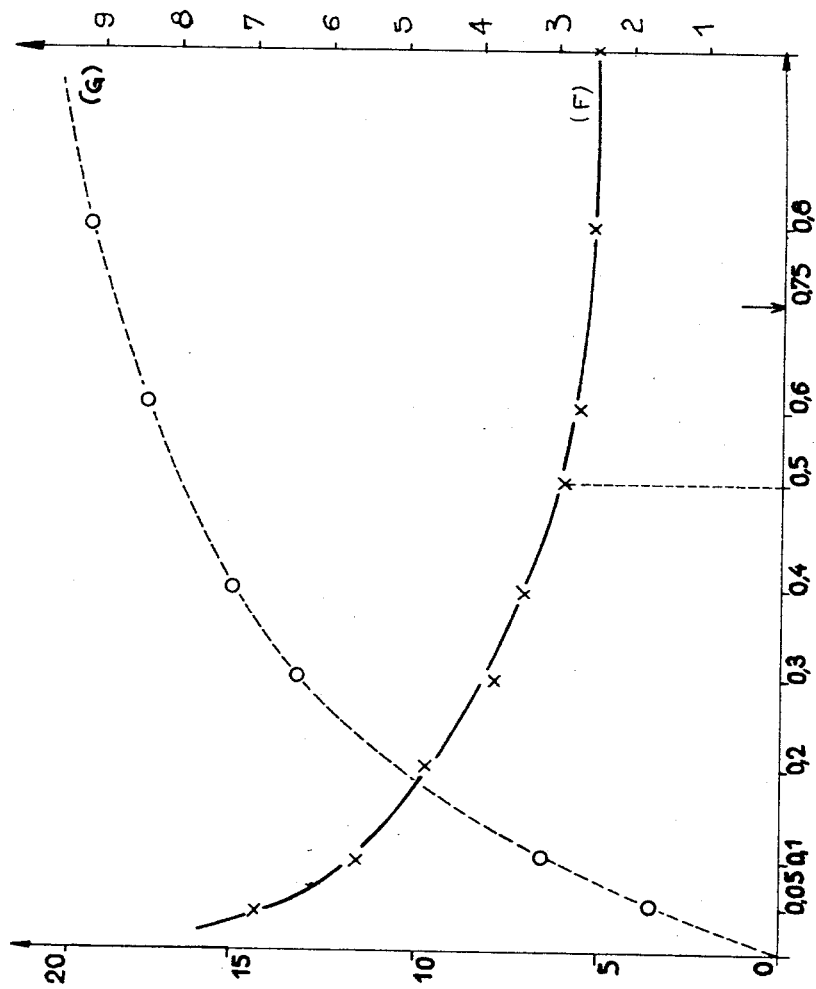

FIGURE 4 of the drawings gives the residual coloration as a function of the quantity of amine (LA-2) expressed in percent by volume of the water to be treated, the diluting agent being kerosene employed in a quantity of 20% by volume with respect to the water to be treated; the purifying pH value is 3.6.

The curve F gives the residual coloration; the same figure shows the curve G giving the speed of decantation (expressed as $$\frac{1}{T} \times 1000$$

T being the decantation time in seconds in order to obtain 1 litre of decanted purified water starting from 1.2 l. of water to be purified) as a function of the quantity of amine.

These curves show that the residual coloration decreases rapidly when the quantity of amine increases, all things moreover being equal (pH value, temperature, volume of the solvent). In the present case, the decoloration in practice no longer increases from 0.5% by volume of amine; on the other hand, the speed of decantation continues to increase. In practice, it is advantageous to take an excess of amine, in view of the regeneration, in order to obtain a rapid decantation. The upper limit is fixed by the quantity for which there is a risk of formation of emulsion (1% by volume with respect to the water to be treated).

*Influence of the quantity of diluting agent on the decoloration*

FIGURE 5 of the accompanying drawings gives the residual coloration as a function of the quantity of diluting agent kerosene expressed in percent by volume of the water to be treated; the amine LA-2 is utilised in quantity of 0.75% by volume; the purification is effected at different pH value (pH 2.4: curve H; pH 3.7: curve 1; pH 4.2: curve K).

These curves generally show that the volume of diluting agent used does not have much influence on the effectiveness of the treatment.

The lower limit of 5% (by volume with respect to the water) is the minimum and below this it is more difficult to ensure a good contact between the two phases. It is therefore not advantageous to use an excess of diluting agent, particularly when the pH value is of the order of 4.2. On the contrary, it means that it is advantageous to use the most concentrated solution of amine.

For various technological reasons, in particular for avoiding the formation of emulsion, it is desirable not to exceed 10% by volume of amine with respect to the diluting agent.

The volume of diluting agent is generally comprised between about 5% and 20% of the volume of the water to be treated.

Moreover, in the following example, comparative experiments are given in order to illustrate the unexpected side of the invention.

EXAMPLE 3

The experiments mentioned hereinbelow were effected on residual water from washing raw kraft pulp of cluster (maritime) pine, containing about 6 g./l. dry substances.

Experiment 1—Treatment by the amine alone

A quantity of amine "Amberlite LA 2" with 5% (or 5 times that used in the example) of the volume of the water to be purified has been suspended in the residual water readjusted to pH 3.5. After a vigorous agitation, it is ascertained that almost all the amine remains in suspension in the water to be purified, being trapped by the lignin which has more or less flocculated under the pH conditions utilized. In time, there appears a partial deposit of said flocculate. The rest of the flocculate remains solidly adhered to the walls of the tank. The purification is neglible. The separation of the flocculate can be effected only by a long and difficult filtration with an excessive deformation of the filters. The filtered water remains strongly coloured. The decoloration is nil.

Experiment 2—Treatment by the diluting agent alone

By replacing the amine by kerosene (20% by volume with respect to the water) in the preceding Experiment 1, a partial flocculation of the lignin is obtained which is impregnated with diluting agent and which tends to rise very slowly into the aqueous phase. However, this flocculate remains entirely in the aqueous phase, and is long and difficult to filter, with excessive deformation of the filters. This aqueous phase remains strongly coloured. The diluting phase remains colourless.

The case is once more emphasized when the residual water to be treated is constituted by an effluent from washing a paper pulp with bisulphite, the amount of organic matters (determined by direct dosage by oxidation by bichromate and expressed in oxygen consumed in mg./l.) being 9750 mg./l. and containing lignin soluble in acid (lignosulfonic acids); in such a case, only a small decoloration (13% of coloured products eliminated) is observed and no elimination of organic matters when amine is not used, but only kerosene.

Experiment 3.—Successive treatment by amine and the diluting agent

After intimately mixing the amine (1% by volume) and the water to be purified, the later addition of diluting agent (20% by volume) carries down one part of the amine, lignin flocculate with the exception however of the flocculate which adheres strongly to the walls. In practice, under these conditions, the organic phase contains hardly 50% of the organic matters to be extracted.

Experiment 4.—Treatment by the mixture of amine and diluting agent

In the case where an organic phase is used containing both the amine (1% by volume) and the diluting agent (20% by volume), the amine-lignin precipitate formed does not adhere to the walls and decants completely in the organic phase which extracts 65% of organic matters and about 92% coloured matters. Moreover, this precipitate is homogeneous whilst in the preceding case (Experiment 3) one part is precipitated in a compact form which is difficult to regenerate.

The essential industrial advantages which the process according to the invention gives, may be summarized as follows:

(1) The purifying stage, during which the organic matters and the coloured matters are removed from the residual water and concentrated in the organic phase, constitutes an effective rapid and simple purifying means:

Said means being effective by reason of the affinity of the amine chosen for a large number of organic products which are contained in the effluents coming from the manufacture of cellulose and paper pulp.

The stability of the compounds which are formed is increased in the organic diluting agents chosen, this contributing to the effectiveness of the treatment.

The amine reacts with the lignin and its derivatives which are practically completely eliminated, the organic acids which react partially, finally with the various coloured compounds which are absorbed selectively.

Said means being rapid due to the fact that the decantation speed is high by reason of the reciprocal insolubility of the two liquid phases and their considerable difference in density in the majority of cases.

Said means being simple because a single decantation takes the place both of a filtration for the precipitate formed and a powerful drying, the quantity of water carried down in the organic phase being very small. This simple operation is the equivalent of a decantation, a thickening and a partial drying of the mud obtained by the conventional methods of precipitation in aqueous phase, particularly by defecation with the aid of heavy cations.

(2) The regeneration stage permits both the organic phase (amine and diluting agent) to be recuperated and recycled with very small losses; the organic matters extracted from the water to be purified to be recuperated in the form of an alkaline solution at a sufficient concentration for the evaporation and the combustion of this solution not to be deficient from the thermal point of view.

(3) These regeneration solutions can be recuperated in the circuits for manufacturing paper pulp because they contain no substance of nature to disturb the good running of the normal manufacturing flowlines.

This possibility constitutes an important advantage of the process of the invention which can easily be integrated with the main manufacture of the paper etc.

Thus one no longer has the usual waste in the form of mud, the elimination of which always raises awkward problems which are difficult to resolve.

I claim:

1. A process for purifying residual water containing wood and vegetable incrusting media and their degradation products, comprising adjusting the pH of said water to a pH value in the range from 2 to about 5, contacting the resulting water with an organic phase composed essentially of at least one amine which is insoluble in water and has a molecular weight of at least about 250 in solution in a diluting agent which is non-miscible in water and which has a dielectric constant, measured at 20° C., of lower than 4.8 in order to form substantially water-insoluble organophilic amine complexes and compounds of the organic matters and coloured products of the water, extracting said water insoluble organophilic amine complexes and compounds into the organic phase, and decanting and separating the charged organic phase from the purified aqueous phase.

2. A process according to claim 1, wherein said diluting agent is selected from the group consisting of: benzene, toluene, xylene, trimethylbenzene, diethylbenzene, dodecylbenzene, hexane, heptane, octane, nonane, decane dodecane, liquid paraffinic cuts up to about $C_{12}$, cycloparaffins, cyclohexane, alkylcyclohexanes, carbon tetrachloride, trichlorethylene, petroleum ether, heavy oils, white-spirit, kerosene, illuminating oil, gas oil, and fuel oil.

3. A process according to claim 1, wherein the amine is employed in quantity of at the most 1% by volume with respect to the water to be treated.

4. A process according to claim 1, wherein the diluting agent is used in a quantity of at least 5% by volume with respect to the water to be treated.

5. A process according to claim 1, wherein said purification stage is followed by a regeneration stage in which the decanted and separated charged organic phase arising from said purification stage is contacted with an aqueous alkaline solution in order to decompose the addition compounds and various complexes of the amine with the organic matters extracted, and in order to regenerate the amine, and the organic phase containing the regenerated amine is separated and recycled to the purification stage.

6. A process according to claim 5, wherein the regeneration step comprises placing the decanted and separated organic phase arising from the purification stage in contact with an aqueous alkaline solution followed by a decantation at a temperature which is at least 60° C., at a pH value in excess of pH 11.

7. A process according to claim 1, wherein the residual water to be treated is adjusted to a pH value between pH 2 and pH 4, and the decantation of organic phase from the aqueous phase is conducted at a temperature of between about 40 and 60° C.

8. A process according to claim 7, wherein said purification stage is completed by a supplementary purification of the purified aqueous phase with organic phase containing said amine, at a lower temperature, of the order of 30° C., in order to accentuate the elimination of the coloured products.

9. A process according to claim 1, wherein the amine is chosen from the group consisting of:

(a) the primary amines from $C_{20}$ to $C_{25}$, and the secondary and tertiary long chain aliphatic amines, of high molecular weights of about at least 250 and which amines are practically insoluble in water;
(b) the aromatic amines of high molecular weights of about at least 250; and
(c) the mixed aliphatic-aromatic amines of high molecular weights of about at least 250.

10. A process according to claim 9, wherein said aliphatic amine is selected from the group consisting of tri-isooctylamine, N-lauryl-trialkylmethylamine, trilaurylamine, tricaprylamine, tri-n-hexylamine, and the primary amines, from $C_{20}$ to $C_{25}$, wherein said aromatic amine is tribenzylamine, and wherein said mixed amine is selected from the group consisting of benzyldilaurylamine and N-benzyl-1-(3-ethylpentyl)-4-ethyl-octylamine.

References Cited

UNITED STATES PATENTS 3,251,820  5/1966  Grangaard _____ 260—124.3
3,267,029  8/1966  Campbell et al. _____ 210—21

MICHAEL E. ROGERS, *Primary Examiner.*